(12) United States Patent
Chatterjee et al.

(10) Patent No.: US 8,577,592 B2
(45) Date of Patent: Nov. 5, 2013

(54) VEHICLE COLLISION WARNING SYSTEM AND METHOD OF OPERATING THE SAME

(75) Inventors: Aamrapali Chatterjee, Okemos, MI (US); Chad T. Zagorski, Clarkston, MI (US); Paul R. Williams, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 272 days.

(21) Appl. No.: 13/111,042

(22) Filed: May 19, 2011

(65) Prior Publication Data

US 2012/0293314 A1    Nov. 22, 2012

(51) Int. Cl.
*G06F 17/10* (2006.01)

(52) U.S. Cl.
USPC ................................ 701/301; 701/300; 701/1

(58) Field of Classification Search
USPC ............................................. 701/1, 301, 300
See application file for complete search history.

(56) References Cited

U.S. PATENT DOCUMENTS

| | | | | |
|---|---|---|---|---|
| 5,659,304 A | * | 8/1997 | Chakraborty | 340/903 |
| 6,517,172 B1 | * | 2/2003 | Bond et al. | 303/193 |
| 7,002,452 B2 | * | 2/2006 | Watanabe et al. | 340/436 |
| 7,124,027 B1 | * | 10/2006 | Ernst et al. | 701/301 |
| 7,647,178 B2 | * | 1/2010 | Ekmark et al. | 701/301 |
| 2009/0322500 A1 | | 12/2009 | Chatterjee et al. | |

* cited by examiner

*Primary Examiner* — Mary Cheung
*Assistant Examiner* — Michael Berns
(74) *Attorney, Agent, or Firm* — Lionel D. Anderson; Reising Ethington P.C.

(57) ABSTRACT

A vehicle collision warning system and method may be used to detect a potential or impending collision with another vehicle and to send a corresponding warning to the driver. In an exemplary embodiment, the collision warning system uses one or more target vehicle readings (e.g., a relative velocity reading ($\Delta v$), a target vehicle acceleration reading ($a_{TAR}$), and a relative distance reading or range ($\Delta d$)) to solve a unified collision warning algorithm. If the unified collision warning algorithm determines that there is a potential collision with the target vehicle, then the system sends a corresponding warning to the driver.

19 Claims, 2 Drawing Sheets

VEHICLE COLLISION WARNING SYSTEM AND METHOD OF OPERATING THE SAME

TECHNICAL FIELD

Figure 1:
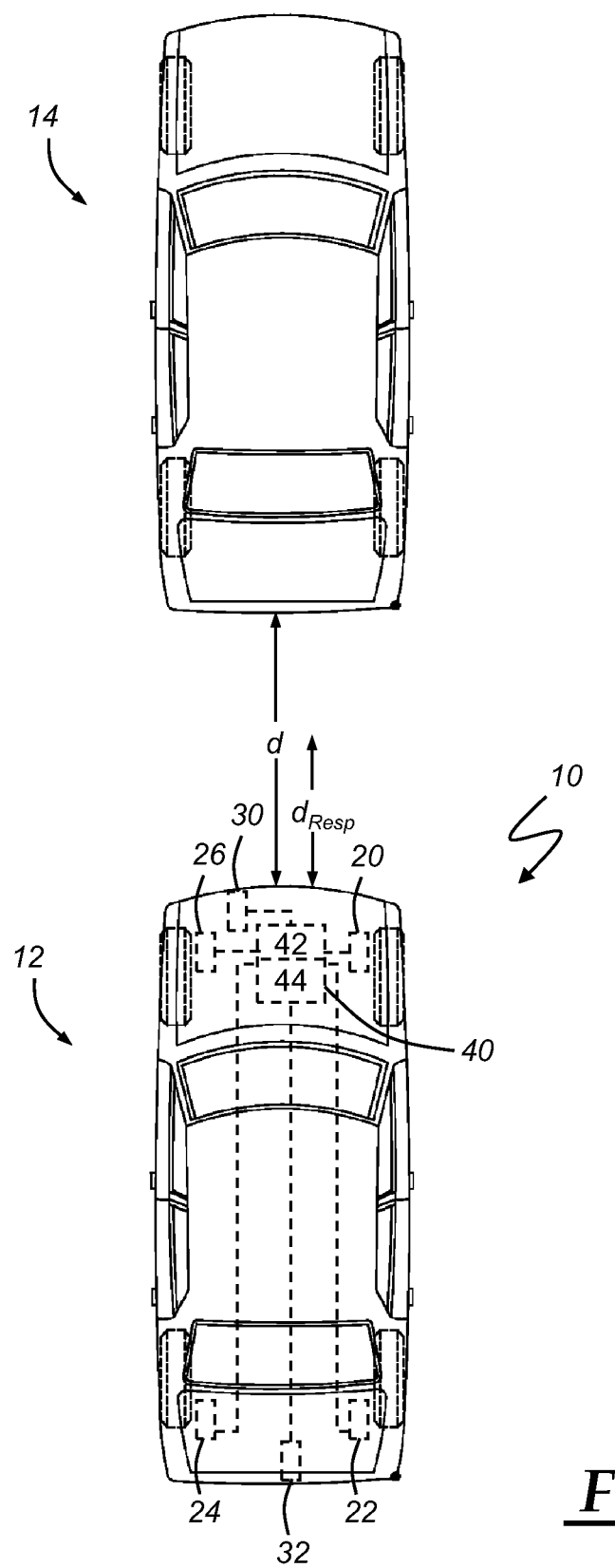

The present invention generally relates to vehicle systems, and more particularly, to vehicle collision warning systems that send warnings to drivers about potential or impending collisions.

BACKGROUND

A vehicle collision warning system may be used to warn or otherwise alert a driver of a potential collision with another vehicle (referred to here as "the target vehicle"). Some of the vehicle collision warning systems currently in use, however, are complex and have difficulty maintaining robustness when the relative position, velocity and/or acceleration of the target vehicle dynamically changes with respect to that of the host vehicle. Such vehicle collision warning systems can be computational intensive and may need to continuously switch or toggle between different algorithms in response to the dynamic conditions.

SUMMARY

According to one embodiment, there is provided a method for use with a vehicle collision warning system. The method may comprise the steps of: (a) receiving one or more reading(s) from a target vehicle sensor; (b) using the reading(s) to solve a unified collision warning algorithm, wherein the unified collision warning algorithm detects a potential collision without continuously switching between different algorithms in response to dynamic conditions; and (c) sending a warning to a driver if the unified collision warning algorithm determines that a potential collision exists.

According to another embodiment, there is provided a method for use with a vehicle collision warning system. The method may comprise the steps of: (a) receiving one or more reading(s) from a target vehicle sensor; (b) using the reading(s) to evaluate an expression, wherein the expression includes at least one of the following terms: a first term having a square of a relative velocity reading ($\Delta v$), a second term having a difference between a host vehicle response value ($R_{HOST}$) and a target vehicle acceleration reading ($a_{TAR}$), and a third term having a difference between a relative distance reading ($\Delta d$) and a gap setting value ($G_{SETTING}$); and (c) sending a warning to a driver if the evaluation of the expression suggests a potential collision.

According to another embodiment, there is provided a vehicle collision warning system, wherein the system is mounted on a host vehicle and detects a potential collision with a target vehicle. The vehicle collision warning system may comprise: one or more target vehicle sensor(s) being mounted on the host vehicle and reflecting electromagnetic signals off of the target vehicle; and a control module being electronically coupled to the target vehicle sensor(s) and receiving target vehicle readings from the sensor(s). The control module uses the target vehicle readings to solve a unified collision warning algorithm that detects a potential collision with the target vehicle without continuously switching between different algorithms in response to dynamic conditions.

DRAWINGS

Figure 2:
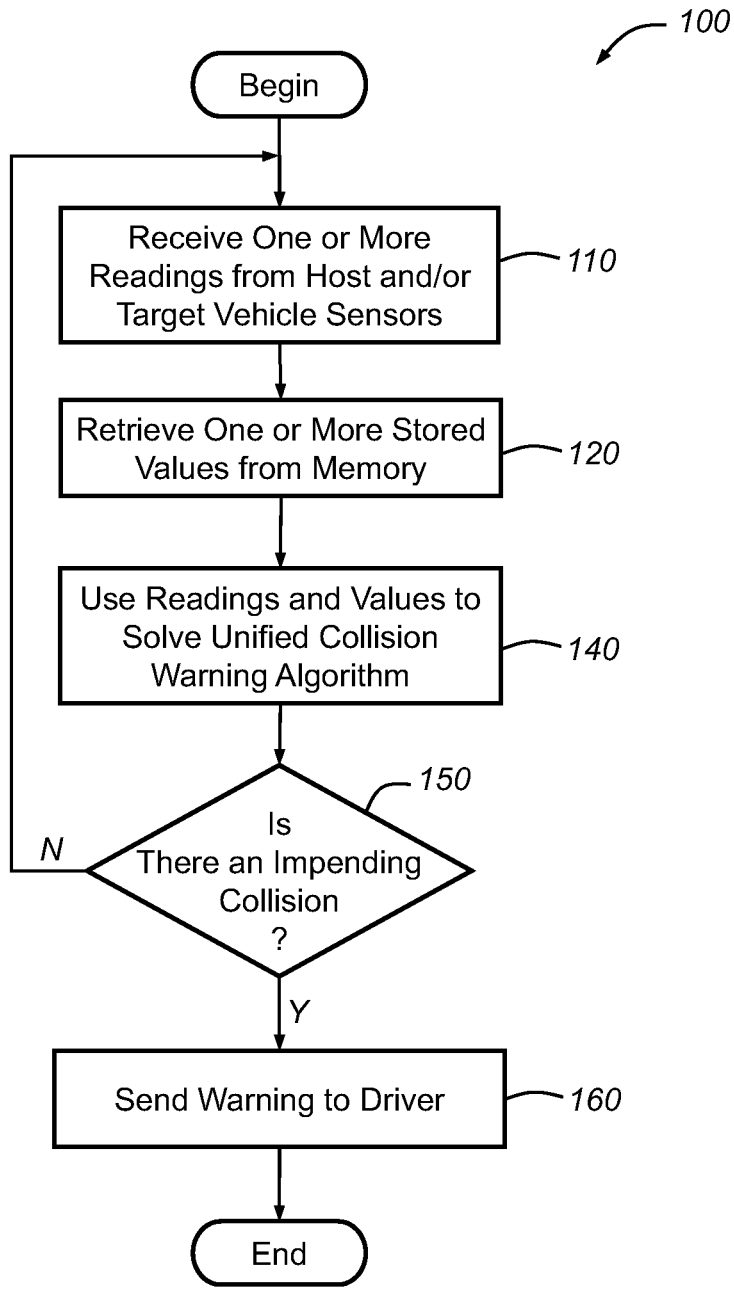

Preferred exemplary embodiments will hereinafter be described in conjunction with the appended drawings, wherein like designations denote like elements, and wherein:

FIG. 1 is a schematic view illustrating a host vehicle having an exemplary vehicle collision warning system and a target vehicle; and FIG. 2 is a flowchart illustrating an exemplary method for use with a vehicle collision warning system, such as the exemplary system shown in FIG. 1.

DESCRIPTION

The exemplary vehicle collision warning system and method described herein may be used to detect a potential or impending collision with another vehicle and send a corresponding warning to the driver. In an exemplary embodiment, the collision warning system uses one or more target vehicle readings (e.g., target vehicle position, velocity and/or acceleration) to solve a unified collision warning algorithm. If the unified collision warning algorithm determines that there is a potential collision with the target vehicle, then it sends a corresponding warning to the driver. The unified collision warning algorithm may be applicable across a range of dynamic conditions, so that the exemplary method does not need to continuously switch or toggle between different algorithms in response to the changing conditions.

With reference to FIG. 1, there is shown a general and schematic view of an exemplary vehicle collision warning system 10 that is installed on a host vehicle 12 and may be used to detect a potential collision with a target vehicle 14. It should be appreciated that the present system and method may be used with any type of vehicle, including traditional vehicles, hybrid electric vehicles (HEVs), extended-range electric vehicles (EREVs), battery electrical vehicles (BEVs), motorcycles, passenger vehicles, sports utility vehicles (SUVs), cross-over vehicles, trucks, vans, buses, recreational vehicles (RVs), etc. These are merely some of the possible applications, as the system and method described herein are not limited to the exemplary embodiments shown in FIGS. 1 and 2, and could be implemented in any number of different ways. According to one example, vehicle collision warning system 10 includes host vehicle sensors 20-26, target vehicle sensors 30-32, and a control module 40.

Any number of different sensors, components, devices, modules, systems, etc. may provide vehicle collision warning system 10 with information or input that can be used by the present method. These include, for example, the exemplary sensors shown in FIG. 1, as well as other sensors that are known in the art but are not shown here. It should be appreciated that host vehicle sensors 20-26, target vehicle sensors 30-32, as well as any other sensor located in and/or used by collision warning system 10 may be embodied in hardware, software, firmware or some combination thereof. These sensors may directly sense or measure the conditions for which they are provided, or they may indirectly evaluate such conditions based on information provided by other sensors, components, devices, modules, systems, etc. Furthermore, these sensors may be directly coupled to control module 40, indirectly coupled via other electronic devices, a vehicle communications bus, network, etc., or coupled according to some other arrangement known in the art. These sensors may be integrated within another vehicle component, device, module, system, etc. (e.g., sensors integrated within an engine control module (ECM), traction control system (TCS), electronic stability control (ESC) system, antilock brake system (ABS), etc.), they may be stand-alone components (as schematically shown in FIG. 1), or they may be provided according to some other arrangement. It is possible for any of the various sensor readings described below to be provided by some other component, device, module, system, etc. in vehicle 12 instead of being directly provided by an actual sensor element. In some instances, multiple sensors might be employed to sense a single parameter (e.g., for providing signal redundancy). It should be appreciated that the foregoing scenarios represent only some of the possibilities, as any type of suitable sensor arrangement may be used by collision warning system 10. That system is not limited to any particular sensor or sensor arrangement.

Host vehicle sensors 20-26 provide vehicle collision warning system 10 with host vehicle readings or other information that may be used by a unified collision warning algorithm to detect a potential collision. In one embodiment, host vehicle sensors 20-26 generate readings that are representative of the position, velocity and/or acceleration of host vehicle 12. Some examples of such readings include a host vehicle velocity reading ($v_{HOST}$) and a host vehicle acceleration reading ($a_{HOST}$). Host vehicle sensors 20-26 may utilize a variety of different sensors and sensing techniques, including those that use rotational wheel speed, ground speed, accelerator pedal position, gear shifter selection, accelerometers, engine speed, engine output, and throttle valve position, to name a few. In the example shown in FIG. 1, individual wheel speed sensors 20-26 are coupled to each of the host vehicle's four wheels and separately report the rotational velocity of the four wheels. Skilled artisans will appreciate that these sensors may operate according to optical, electromagnetic or other technologies, and that other parameters may be derived or calculated from the velocity readings, such as vehicle acceleration. In another embodiment, host vehicle sensors 20-26 determine vehicle speed relative to the ground by directing radar, laser and/or other signals towards the ground and analyzing the reflected signals, or by employing feedback from a Global Positioning System (GPS). As mentioned above, host vehicle sensors 20-26 may be part of some other device, module, system, etc., like an anti-lock braking system (ABS).

Target vehicle sensors 30-32 provide vehicle collision warning system 10 with target vehicle readings or other information that may be used by a unified collision warning algorithm to detect a potential collision. In one embodiment, target vehicle sensors 30-32 generate readings that are representative of the position, velocity and/or acceleration of target vehicle 14. These readings may be absolute in nature (e.g., a target vehicle velocity reading ($v_{TAR}$) or a target vehicle acceleration reading ($a_{TAR}$) that is relative to ground) or they may be relative in nature (e.g., a relative velocity reading ($\Delta v$) which is the difference between target and host vehicle velocities, or a relative acceleration reading ($\Delta a$) which is the difference between target and host vehicle accelerations). According to one example, target vehicle sensor 30 provides collision warning system 10 with the following inputs: a relative velocity reading ($\Delta v$), an actual target vehicle acceleration reading ($a_{TAR}$), and a relative distance reading ($\Delta d$) which is the range or distance between the target and host vehicles. Each sensor 30, 32 may be a single sensor or a combination of sensors, and may include a light detection and ranging (LIDAR) device, radio detection and ranging (RADAR) device, vision device (e.g., camera, etc.), laser diode pointer, or a combination thereof. According to an exemplary embodiment, sensor 30 includes a forward-looking long-range RADAR or LIDAR device that is mounted on the front of the vehicle, such as at the front bumper or behind the vehicle grille, and sensor 32 is a rearward-looking version of the same. A camera could be used in conjunction with such sensors. It is possible for collision warning system 10 to only include a front or forward-looking sensor 30 such that the system is only a front warning system, as opposed to being both a front and rear warning system. Collision warning system 10 is not limited to any particular type of sensor or sensor arrangement, specific technique for gathering or processing sensor readings, or particular method for providing sensor readings, as the embodiments described herein are simply meant to be exemplary.

Control module 40 may include any variety of electronic processing devices, memory devices, input/output (I/O) devices, and/or other known components, and may perform various control and/or communication related functions. In an exemplary embodiment, control module 40 includes an electronic memory device 42 that stores various sensor readings (e.g., position, velocity and/or acceleration readings from sensors 20-26 and 30-32), look up tables or other data structures, algorithms (e.g., the unified collision warning algorithm described below), etc. Memory device 42 may also store pertinent characteristics and background information pertaining to vehicle 12, such as information relating to stopping distances, deceleration limits, temperature limits, moisture or precipitation limits, driving habits or other driver behavioral data, etc. Control module 40 may also include an electronic processing device 44 (e.g., a microprocessor, a microcontroller, an application specific integrated circuit (ASIC), etc.) that executes instructions for software, firmware, programs, algorithms, scripts, etc. that are stored in memory device 42 and may govern the processes and methods described herein. Control module 40 may be electronically connected to other vehicle devices, modules and systems via suitable vehicle communications and can interact with them when required. These are, of course, only some of the possible arrangements, functions and capabilities of control module 40, as other embodiments could also be used.

Depending on the particular embodiment, control module 40 may be a stand-alone vehicle electronic module (e.g., an object detection controller, a safety controller, etc.), it may be incorporated or included within another vehicle electronic module (e.g., a park assist control module, brake control module, etc.), or it may be part of a larger network or system (e.g., a traction control system (TCS), electronic stability control (ESC) system, antilock brake system (ABS), driver assistance system, adaptive cruise control system, lane departure warning system, etc.), to name a few possibilities. Control module 40 is not limited to any one particular embodiment or arrangement.

Turning now to FIG. 2, there is shown an exemplary method 100 that may be used with vehicle collision warning system 10 to detect a potential or impending collision and to send a corresponding warning to the driver. According to the exemplary embodiment described here, method 100 uses one or more host and/or target vehicle readings to solve a unified collision warning algorithm that evaluates potential collisions. Instead of relying upon an elaborate and complex driver behavioral model that continuously switches from one algorithm to another in response to dynamic conditions, the unified collision warning algorithm integrates or converges multiple algorithms into one. The unified collision warning algorithm may reduce the computational burden on the collision warning system, it may reduce the number of false collision warnings, it may simplify the system and make it more robust, it may make calibration and implementation of the system easier, and it may avoid undesirable mathematical situations like division-by-zero or negative square-root scenarios, to cite a few possible advantages.

A "unified collision warning algorithm," as used herein, broadly refers to any algorithm, equation, expression, condition, model, or combination thereof that detects or otherwise evaluates possible collisions, and does so in a generally unified or integrated manner so that there is no need to continuously switch or toggle between different algorithms in response to dynamic conditions. That is not to say, however, that a system using the unified collision warning system will not occasionally execute a different algorithm, only that it does not need to constantly jump from one algorithm to another when evaluating an impending collision due to changes in the relative position, velocity or acceleration of a target vehicle. Such discontinuities in the execution of an algorithm can make it difficult for some collision warning systems to maintain a desirable degree of robustness. In one example, method 100 is executed or performed by control module 40 and completes an evaluation or cycle on a periodic basis (e.g., every 40 ms).

Beginning with step 110, the method receives one or more readings from host vehicle sensors 20-26 and/or target vehicle sensors 30-32. According to one particular embodiment, step 110 receives the following readings from target vehicle sensor 30: a relative velocity reading ($\Delta v$) that is representative of the difference between target and host vehicle velocities, a target vehicle acceleration reading ($a_{TAR}$), and a relative distance reading ($\Delta d$) that is representative of the range or distance between the target and host vehicles. These measurements or readings will be subsequently used by the unified collision warning algorithm, as will be explained. Some other examples of potential readings that may be gathered in step 110 include: a target vehicle velocity reading ($v_{TAR}$), a host vehicle velocity reading ($v_{HOST}$), a host vehicle acceleration reading ($a_{HOST}$), and a relative acceleration reading ($\Delta a$) that is representative of the difference between target and host vehicle accelerations, to name but a few. In the exemplary embodiment of FIG. 1, these readings are provided by sensors 20-26 and/or 30-32, however, they may be provided by different components, devices, modules, systems, etc. located around host vehicle 12. It is possible for the method to only use sensor readings from a single target vehicle sensor, such as a single long-range RADAR or LIDAR sensor, so that system costs are reduced. In addition, step 110 may gather weather conditions, traffic conditions, and/or other suitable and useful information telematically provided to host vehicle 12 via some type of wireless telematics unit, for example. The readings received in step 110 may be filtered, adjusted, converted, averaged and/or otherwise processed before being used by the unified collision warning algorithm.

Next, step 120 retrieves one or more stored values from memory. According to one particular embodiment, step 120 retrieves or otherwise gathers the following values from electronic memory device 42 or some other suitable memory device: a host vehicle response value ($R_{HOST}$) and a gap setting value ($G_{SETTING}$). These values will be subsequently used by the unified collision warning algorithm, as will be explained. The "host vehicle response value ($R_{HOST}$)," as used herein, broadly refers to an estimated deceleration capability of host vehicle 12. In one example, the ($R_{HOST}$) value is an estimate of the maximum amount of braking deceleration that the driver of the host vehicle is likely to exert once the driver has been alerted to an impending collision. The ($R_{HOST}$) value may take into account a variety of different factors, such as: the type, size and/or weight of host vehicle 12 (e.g., a nimble sports car could have a higher value than a large commercial truck), a braking response (e.g., the presence of antilock brakes and/or traction control could affect this value), a steering response, past driving behavior, current traffic scenarios (e.g., slow moving versus fast moving traffic could affect this value), current weather conditions (e.g., the presence of snow, ice, rain, etc. could affect this value), and current road conditions (e.g., paved versus gravel or dirt road surfaces could influence this value). The ($R_{HOST}$) value may be static such that it is saved to memory during manufacture and does not change, or it may be dynamic where it is regularly updated to take into account one or more of the factors listed above. It is also possible for the ($R_{HOST}$) value to include multiple values; for example, a first value for when the vehicle is traveling in a first speed range, a second value when the vehicle is traveling in a second speed range, and so on. According to one exemplary embodiment, the ($R_{HOST}$) value is in units of deceleration and may vary from between 0.35 g to 0.75 g. For instance, the ($R_{HOST}$) value for a truck can be about 0.55 g while the ($R_{HOST}$) value for a car can be about 0.65. These are, of course, only examples which are provided solely for purposes of illustration.

As mentioned above, step 120 may also gather a gap setting value ($G_{SETTING}$). This value, like the host vehicle response value ($R_{HOST}$), can also be retrieved from electronic memory device 42 or some other suitable memory and can be subsequently used by the unified collision warning algorithm. The "gap setting value ($G_{SETTING}$)," as used herein, broadly refers to a distance between the host and target vehicle that influences when a warning or alert is sent to the driver. This value can be static or dynamic. In one exemplary embodiment, the ($G_{SETTING}$) value is calibratable so that the driver can control or adjust how much time they have between when a collision warning is sent and when they must engage in a collision avoidance maneuver. For example, host vehicle 12 may offer a number of different driver-selected settings (e.g., 1, 2, and 3) that correspond to aggressive, semi-aggressive, and passive ($G_{SETTING}$) values, where the aggressive setting provides the least response distance for the driver and the passive setting provides the most response distance. Generally, the more response distance that is given, the higher the likelihood for false collision warnings. The ($G_{SETTING}$) value may be selected by the driver via a gap setting switch or other control on the instrument panel, and it may be shared or used by other systems in the vehicle, like an adaptive cruise control system. In a separate embodiment, the ($G_{SETTING}$) value is automatically determined or generated by the vehicle itself after collecting and analyzing data on the vehicle and/or driver (e.g., past driving behavior, brake response times, etc.).

Both the host vehicle response value ($R_{HOST}$) and the gap setting value ($G_{SETTING}$) may be calibrated or adjusted by the driver, as explained above. By altering one or both of these values, the driver is provided with the opportunity to tinker or fine tune the operation of vehicle collision warning system 10. This feature (i.e., calibrating or adjusting these values) is not necessary or mandatory, however, as other embodiments of the collision warning system may use non-calabratable values instead.

Turning now to step 140, the method uses the readings and/or values gathered in the previous steps to solve a unified collision warning algorithm. Now that all of the input for the algorithm has been gathered—relative velocity reading $\Delta v$, host vehicle response value ($R_{HOST}$), target vehicle acceleration ($a_{TAR}$), relative distance reading $\Delta d$, and gap setting value ($G_{SETTING}$)—step 140 may execute or otherwise solve the unified collision warning algorithm. In an exemplary embodiment, the unified collision warning algorithm is expressed as a simple, yet information-rich formula that provides the functional advantage of not containing any terms that can result in a division-by-zero or a negative square-root scenario. An exemplary expression of the unified collision warning algorithm is provided in equation 1, and contains three different mathematical terms.

$$\Delta v^2 + 2(R_{HOST} - a_{TAR})(\Delta d - G_{SETTING}) > 0 \quad \text{(Equation 1)}$$

A first mathematical term includes the square of the relative velocity reading ($\Delta v$), which is representative of the difference between the target vehicle velocity ($v_{TAR}$) and the host vehicle velocity ($v_{HOST}$); $\Delta v=(v_{TAR}-v_{HOST})$. A second mathematical term includes the difference between the host vehicle response value ($R_{HOST}$) and the target vehicle acceleration reading ($a_{TAR}$); ($R_{HOST}-a_{TAR}$). A third mathematical term includes the difference between the relative distance reading ($\Delta d$) and the gap setting value ($G_{SETTING}$); ($\Delta d-G_{SETTING}$). Equation 1 multiplies the second and third terms together, the product of which is then multiplied by a factor of two. This overall product is then added to the first term. It should be appreciated that the unified collision warning algorithm may be manipulated and differ somewhat from the exemplary form shown here, as other embodiments or versions of the algorithm are possible.

Method 100 may differ from other collision warning methods in that it can detect a potential or impending collision without continuously switching between different algorithms in response to dynamic conditions. To illustrate this point, consider Equation 1. This equation or expression may be applicable over a variety of relative distances, relative velocities and relative accelerations; that is, the same equation can be used even when the relative distance between the target and host vehicles changes, when the relative velocity between the target and host vehicle changes, and/or when the relative acceleration between the target and host vehicle changes. The same is not true for all collision warning methods. For instance, some methods employ a first algorithm when the relative acceleration between the vehicles is relatively constant and a second algorithm when the relative acceleration is varying. Switching back and forth between these and other algorithms can result in a discontinuous execution, where a first algorithm is not totally solved or evaluated before it is time to take up a second algorithm. Exemplary method 100, on the other hand, can be deployed or used over a wider range of dynamic conditions and therefore may not experience some of the same discontinuities as experienced by other methods. Moreover, because method 100 uses a unified collision warning algorithm with one or more calibratable values (i.e., host vehicle response value ($R_{HOST}$) and gap setting value ($G_{SETTING}$)), system 10 and/or method 100 may be easily adapted or calibrated for different vehicles, including vehicles that have minimal sensor hardware.

Step 150 determines if a potential or impending collision exists, and may do so in a variety of different ways. For example, step 150 may evaluate the results of the unified collision warning algorithm and if the result or output of the algorithm is greater than '0', then the method assumes that there is an impending collision and proceeds to the next step; if the result or output of the algorithm is less than '0', then the method assumes that no impending collision exists and the method loops back to step 110 for further monitoring. According to one embodiment, step 150 only needs to determine that there is an impending collision one time before proceeding to the next step; in a different embodiment, step 150 may need to confirm the existence of the potential collision several times before continuing to the next step and issuing an alert (e.g., step 150 may need three cycles in a row (120 ms) before proceeding to step 160). Skilled artisans will appreciate that step 150 does not have to compare the result of the unified collision warning algorithm to the value '0', as it could compare the algorithm results to some other value instead. The value that the results are compared to could be calibrated or adjusted in order to control the sensitivity of vehicle collision warning system 10. Other embodiments are also possible.

Step 160 sends a warning or alert to the driver if the method determines that a potential collision exists. The warning may be delivered or conveyed in any number of different ways, as step 160 is not limited to any particular one. For example, processor 44 may send an alert signal via a vehicle bus to one or more visual and/or audible indicators within the vehicle cabin. Some suitable indicators may include visual displays like flashing lights, textual messages on a display, projected warnings on a corner of the windshield, etc., and some suitable audible indicators may include chimes, audio warnings over the vehicle radio, muting the radio, etc. Step 160 may certainly employ other warnings or alerts, such as tactile alerts like the driver and/or occupant seat belt tightening, haptic or vibrating driver seat, steering wheel, etc. Step 160 is not limited to any particular warning or alert system, so long as the driver is properly warned of the impending collision.

In a different embodiment, the method may even employ a step where one or more corrective or evasive actions are automatically taken. Examples of such actions include automatically controlling the vehicle's speed, steering, suspension, or some other function in an effort to avoid or mitigate the effects of the impending collision. It is also possible to use system 10 and/or method 100 to detect impending collisions with objects other than a target vehicle, such as items or debris in the road, pedestrians, etc.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps disclosed is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for use with a vehicle collision warning system, comprising the steps of:
    (a) receiving one or more reading(s) from a target vehicle sensor and retrieving one or more previously stored value(s) from an electronic memory device including a host vehicle response value ($R_{HOST}$), a gap setting value ($G_{SETTING}$), or both ($R_{HOST}$) and ($G_{SETTING}$), wherein ($R_{HOST}$) is an estimated deceleration capability of a host vehicle based on driver braking and ($G_{SETTING}$) is a distance between a host vehicle and a target vehicle that influences when a warning is sent to the driver;
    (b) using the reading(s) in conjunction with the previously stored value(s) to solve a unified collision warning algorithm with a control module, wherein the unified collision warning algorithm detects a potential collision without continuously switching between different algorithms in response to dynamic conditions; and (c) sending a warning to a driver if the unified collision warning algorithm determines that a potential collision exists.

2. The method of claim 1, wherein step (a) further comprises receiving a relative velocity reading ($\Delta v$) that is representative of the difference between host and target vehicle velocities; and step (b) further includes using the relative velocity reading ($\Delta v$) to solve the unified collision warning algorithm.

3. The method of claim 1, wherein step (a) further comprises retrieving the host vehicle response value ($R_{HOST}$) from the electronic memory device, wherein ($R_{HOST}$) is an estimated deceleration capability of a host vehicle based on driver braking; and step (b) further includes using the host vehicle response value ($R_{HOST}$) to solve the unified collision warning algorithm.

4. The method of claim 3, wherein the host vehicle response value ($R_{HOST}$) is stored in the electronic memory device and varies by vehicle type.

5. The method of claim 3, wherein step (a) further comprises receiving a target vehicle acceleration reading ($a_{TAR}$); and step (b) further includes subtracting the target vehicle acceleration reading ($a_{TAR}$) from the host vehicle response value ($R_{HOST}$) to solve the unified collision warning algorithm.

6. The method of claim 1, wherein step (a) further comprises receiving a relative distance reading ($\Delta d$) that is representative of the distance between the host and target vehicles; and step (b) further includes using the relative distance reading ($\Delta d$) to solve the unified collision warning algorithm.

7. The method of claim 6, wherein step (a) further comprises retrieving the gap setting value ($G_{SETTING}$); and step (b) further includes subtracting the gap setting value ($G_{SETTING}$) from the relative distance reading ($\Delta d$) to solve the unified collision warning algorithm.

8. The method of claim 1, wherein the unified collision warning algorithm does not contain any terms that can result in a division-by-zero scenario or a negative-square-root scenario.

9. The method of claim 1, wherein the unified collision warning algorithm uses input from only one target vehicle sensor.

10. A method for use with a vehicle collision warning system, comprising the steps of:

(a) receiving one or more reading(s) from a target vehicle sensor;

(b) using the reading(s) to solve a unified collision warning algorithm with a control module, wherein the unified collision warning algorithm detects a potential collision without continuously switching between different algorithms in response to dynamic conditions; and (c) sending a warning to a driver if the unified collision warning algorithm determines that a potential collision exists, wherein the unified collision warning algorithm includes the following expression: $\Delta v^2 + 2(R_{HOST} - a_{TAR})(\Delta d - G_{SETTING}) > 0$.

11. A method for use with a vehicle collision warning system, comprising the steps of:

(a) receiving one or more reading(s) from a target vehicle sensor;

(b) using the reading(s) to evaluate an expression with a control module, wherein the expression includes at least one of the following terms: a first term having a square of a relative velocity reading ($\Delta v$), a second term having a difference between a host vehicle response value ($R_{HOST}$) and a target vehicle acceleration reading ($a_{TAR}$), and a third term having a difference between a relative distance reading ($\Delta d$) and a gap setting value ($G_{SETTING}$), wherein ($R_{HOST}$) is an estimated deceleration capability of a host vehicle based on driver braking and ($G_{SETTING}$) is a distance between a host vehicle and a target vehicle that influences when a warning is sent to the driver; and (c) sending a warning to a driver if the evaluation of the expression suggests a potential collision.

12. The method of claim 11, wherein step (a) further comprises receiving a relative velocity reading ($\Delta v$) that is representative of the difference between host and target vehicle velocities; and step (b) further includes using the relative velocity reading ($\Delta v$) to evaluate the expression, which includes the first term.

13. The method of claim 11, wherein step (a) further comprises receiving the host vehicle response value ($R_{HOST}$) that is an estimated deceleration capability of a host vehicle based on driver braking and a target vehicle acceleration reading ($a_{TAR}$); and step (b) further includes using the host vehicle response value ($R_{HOST}$) and the target vehicle acceleration reading ($a_{TAR}$) to evaluate the expression, which includes the second term.

14. The method of claim 13, wherein the host vehicle response value ($R_{HOST}$) is stored in an electronic memory device and varies by vehicle type.

15. The method of claim 11, wherein step (a) further comprises receiving a relative distance reading ($\Delta d$) that is representative of the distance between the host and target vehicles and the gap setting value ($G_{SETTING}$); and step (b) further includes using the relative distance reading ($\Delta d$) and the gap setting value ($G_{SETTING}$) to evaluate the expression, which includes the third term.

16. The method of claim 11, wherein the expression does not contain any terms that can result in a division-by-zero scenario or a negative-square-root scenario.

17. The method of claim 11, wherein the expression includes the following unified collision warning algorithm: $\Delta v^2 + 2(R_{HOST} - a_{TAR})(\Delta d - G_{SETTING}) > 0$.

18. The method of claim 11, wherein the expression is evaluated with input from only one target vehicle sensor.

19. A vehicle collision warning system, wherein the system is mounted on a host vehicle and detects a potential collision with a target vehicle, comprising:

one or more target vehicle sensor(s) being mounted on the host vehicle and reflecting electromagnetic signals off of the target vehicle; and a control module being electronically coupled to the target vehicle sensor(s) and receiving target vehicle readings from the sensor(s), wherein the control module is configured to use the target vehicle readings in conjunction with one or more previously stored value(s) from an electronic memory device to solve a unified collision warning algorithm that detects a potential collision with the target vehicle without continuously switching between different algorithms in response to dynamic conditions, the one or more previously stored value(s) includes: a host vehicle response value ($R_{HOST}$) that is an estimated deceleration capability of a host vehicle based on driver braking, a gap setting value ($G_{SETTING}$) that is a distance between a host vehicle and a target vehicle that influences when a warning is sent to a driver, or both ($R_{HOST}$) and ($G_{SETTING}$).

* * * * *